Oct. 11, 1938.  C. J. WERNER  2,132,888
CONTROL SYSTEM
Filed Aug. 26, 1935  2 Sheets-Sheet 1
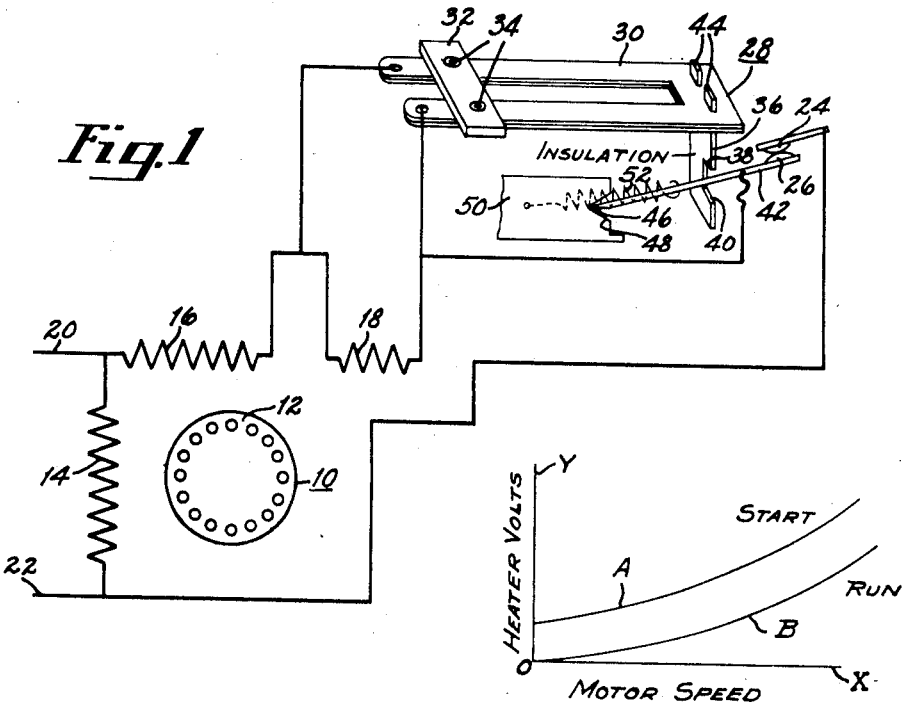
Fig.1
Fig.3
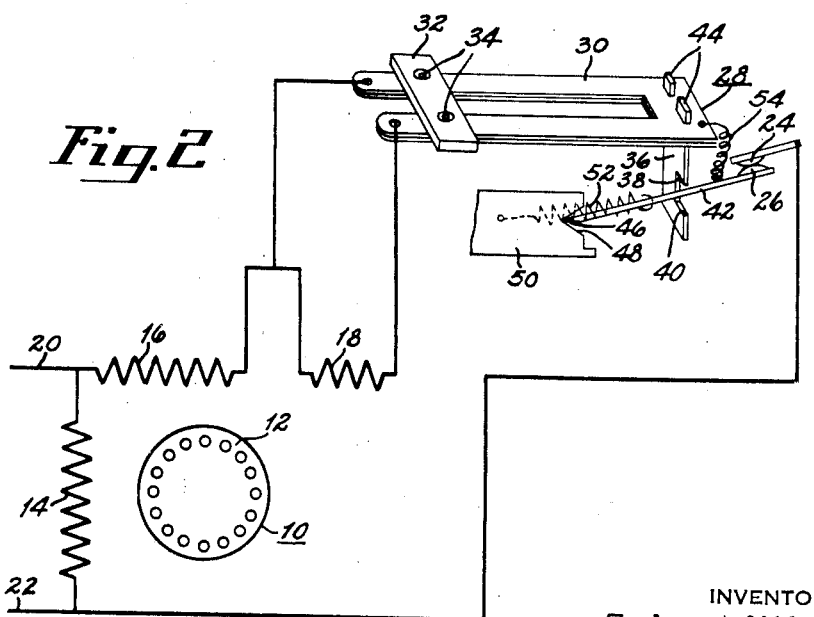
Fig.2
INVENTOR
Calvin J. Werner.
BY
Spencer, Hardman and Fehr
ATTORNEYS Oct. 11, 1938.                    C. J. WERNER                   2,132,888
                                CONTROL SYSTEM
                             Filed Aug. 26, 1935              2 Sheets-Sheet 2

INVENTOR
Calvin J. Werner
BY
Spencer, Hardman and Fehr
ATTORNEYS

Patented Oct. 11, 1938

2,132,888

UNITED STATES PATENT OFFICE 2,132,888

CONTROL SYSTEM

Calvin J. Werner, Dayton, Ohio, assignor to General Motors Corporation, Detroit, Mich., a corporation of Delaware Application August 26, 1935, Serial No. 37,795

12 Claims. (Cl. 172—279)

This invention relates to control systems, and more particularly to control systems for electric motors.

An object of this invention is to provide a control system for an electric motor that is inexpensive to make and quiet in operation.

Another object of this invention is to provide a control system for controlling the starting and running circuits of a single phase motor that is electrically operated and responsive to the speed of the motor rotor.

Another object of this invention is to provide a system for controlling the starting and running circuits of an electric motor, which system includes a thermal-responsive control element.

Another object of this invention is to provide a system for controlling the starting and running circuits of a single phase motor having a starting and a running winding, said system including means at least partially responsive to the starting winding current when the motor is starting, and responsive to a voltage induced by the rotor flux when the motor is running.

Further objects and advantages of the present invention will be apparent from the following description, reference being had to the accompanying drawings wherein a preferred embodiment of the present invention is clearly shown.

In the drawings:

Figure 1 is a schematic circuit diagram of a system embodying a preferred form of this invention.

Figures 2, 4, 5 and 6 are schematic circuit diagrams of systems embodying modified forms of the present invention.

Figure 3 discloses curves that illustrate variations of voltages utilized in the systems shown in Figures 1 and 2.

Figure 4:
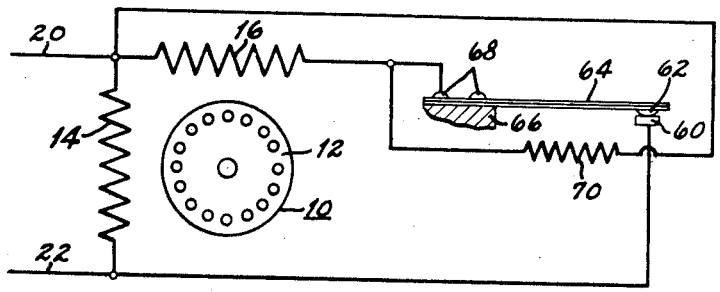
Figure 5:
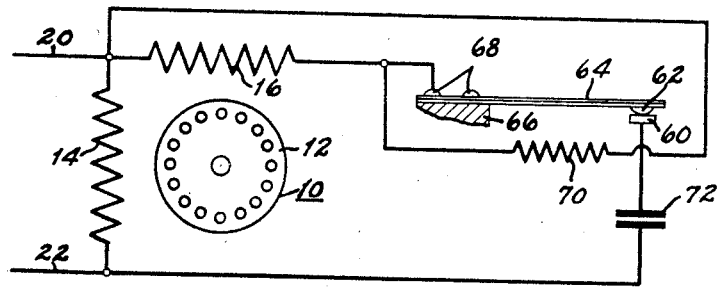
Figure 6:
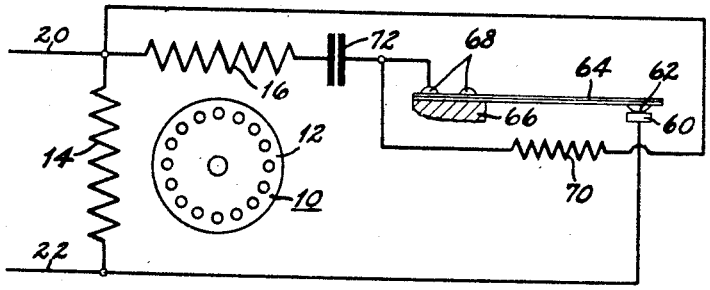
Figure 7:
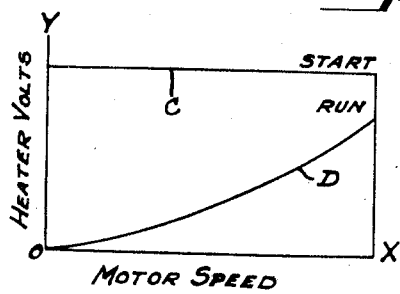

Figure 7 discloses curves that indicate variations of voltages utilized in the systems shown in Figures 4, 5 and 6.

With particular reference to Figure 1, a motor 10 has a rotor 12 that is preferably of the squirrel cage type, which rotor is magnetically associated with the main field winding 14, a starting or auxiliary field winding 16 and a third winding 18. One end of the main field winding 14 is connected to one end of the starting or auxiliary field winding 16 and to a power supply line lead 20. The other end of the main field winding 14 is connected to a power supply line wire 22 and through cooperating contacts 24 and 26 of a switch 28 to one end of the third winding 18. The other end of the third winding 18 is connected to the other end of the starting or auxiliary field winding 16. A thermal-responsive element 30 that is preferably a bimetallic member and preferably substantially U-shaped has its ends respectively connected to the ends of the third winding 18. This thermal-responsive element is anchored, preferably near the open end of the substantially U-shaped member, to a strip of insulating material 32, and is secured to the strip 32 by rivets such as 34, or other suitable fastening means.

By the connections defined above, the thermal-responsive element 30 is connected in parallel with the third winding 18 and in series with the starting or auxiliary field winding 16 when the contacts 24 and 26 are closed. When the contacts 24 and 26 are open, the circuit from the power supply line wire 22 to the auxiliary field winding 16 is open, and the thermal-responsive element is connected across the third winding 18. To effect actuation of the contacts, a member 36 is secured to the end of the thermal-responsive element 30, which member has a recess therein providing shoulders 38 and 40 that engage a movable contact-carrying member 42, upon movement thereof in either direction, to move that contact-carrying member. The member 36 is preferably made of insulating material so that there is no electrical connection between the thermal-responsive element and the contact-carrying member 42. This member 36 preferably has end portions such as 44 that extend through apertures in the thermal-responsive element to secure that member to the thermal-responsive element. The movable contact-carrying member 42 is preferably provided with a knife edge at 46, which knife edge engages a substantially V-shaped notch 48 in a support member 50 to provide a pivotal mounting therefor. A resilient member 52 is connected to the movable contact-carrying member 42 and to the support member 50. This resilient member urges the movable contact-carrying member into engagement with the support member 50, and the longitudinal axis of the resilient member is so related to the axis of the movable contact-carrying member that these axes may cross during the movement of the contact-carrying member to effect snap action of the contact-carrying member. The details of this particular switch and its operation are more fully disclosed and described in my copending application, Serial No. 740,961.

With particular reference to Figure 2, parts bearing reference numerals similar to those of Figure 1, are substantially similar, and perform functions that are substantially similar. In this system, however, the lead connecting the movable contact-carrying member 42 to the end of the third winding is omitted. Furthermore, the member 36 need not be made of insulating material, and it is preferable that the closed end of the substantially U-shaped thermal-responsive element is permanently electrically connected to the movable contact-carrying member 42 by a connecting member that permits movement of the contact-carrying member 42, such as a pigtail connection 54. Consequently, when the contacts 24 and 26 are closed, the starting or auxiliary field winding current flows through the legs of the substantially U-shaped thermal responsive element in parallel and through the connection 54. However, because the third winding is connected in series with one of the legs of the substantially U-shaped thermal-responsive element, the current through that leg will be somewhat less than the current through the other leg, the difference depending upon the impedance of the third winding 18. When the contacts 24 and 26 open, the circuit between the power supply line lead 22 and the starting or auxiliary field winding 16 is opened, and the thermal-responsive element is connected across the third winding as in the system shown in Figure 1.

With particular reference to Figure 3, coordinate axes X and Y have a zero point at their intersection, and curves A and B are drawn with "heater volts" on the Y or ordinate axis and "motor speed" on the X axis or abscissa. Since the third winding 18, shown in Figures 1 and 2, preferably has no effective magnetic coupling with the main field winding 14, but is effectively magnetically coupled with the starting or auxiliary field winding 16 a voltage will be induced across the third winding 18 from the starting or auxiliary field winding 16 when a voltage is applied across the power supply line leads 20 and 22, and before the rotor starts to rotate. This, of course, occurs when the contacts 24 and 26 are closed, as they normally are for starting the motor. This voltage induced across the third winding 18 from the starting or auxiliary field winding 16 accounts for the voltage indicated by the curve A when the motor speed is zero. As the rotor speed increases, and before the contacts 24 and 26 open, the voltage induced across the third winding 18 increases substantially as indicated by the curve A, because of the voltage induced across the third winding by the rotor flux, which voltage increases with the increase of rotor speed. When the contacts 24 and 26 open, there is no longer a voltage induced across the third winding 18 from the starting or auxiliary field winding 16, because the circuit from the power supply line 22 to that winding is opened by the contacts. Hence, the voltage induced across the third winding 18 is substantially only that induced by the rotor flux, and it therefore drops to a point on the curve B. The current flow through the thermal-responsive element that is effected by the latter voltage that is induced by the rotor flux is sufficient to maintain the temperature of the thermal-responsive element at a value sufficiently high to maintain the contacts in an open position. If because of an overload, the rotor speed is reduced, the voltage induced across the third winding 18 diminishes along the curve B. In fact, if the rotor becomes locked, or slows down to zero speed in a short-time interval, the voltage across the third winding 18 may drop to zero along the curve B, because of the lag of the thermal responsive element due to heat retained therein.

With particular reference to Figure 4, reference numerals similar to those previously used refer to parts that are substantially similar. In this system, one end of the main field winding 14 is connected to one end of the starting or auxiliary field winding 16 and to the power supply line lead 20. The other end of the main field winding is connected to the power supply line lead 22 and through cooperating contacts 60 and 62 and a thermal-responsive element 64 to the other end of the starting or auxiliary field winding 16. The contact 60 is preferably stationary, while the contact 62 is mounted near one end of the thermal-responsive element 64 and is movable therewith. The other end of the thermal-responsive element 64 is anchored to a support 66 that is preferably made of insulating material and is secured to said support by rivets such as 68, or other suitable fastenings. A heater such as a resistance element 70 is connected across the starting or auxiliary field winding 16.

With particular reference to Figure 5, reference numerals similar to those previously used refer to parts that are substantially similar. In this system a reactance element 72, such as a condenser, is connected in series with the auxiliary field winding to cause the current flowing through that winding to be out of phase with that of the main field winding when the contacts 60 and 62 are closed. In this form the reactance 72 is connected intermediate the power supply line lead 22 and the contact 60, so that the heater or resistance element 70 is connected directly across the auxiliary field winding, as it is in Figure 4.

With particular reference to Figure 6, reference numerals similar to those previously used also refer to substantially similar parts. In the system illustrated in this figure, the reactance 72 is also connected in series with the starting or auxiliary field winding, but it is connected intermediate the auxiliary field winding and the thermal-responsive element 64. The reactance is thus connected so that the heater or resistance element 70 is connected across the starting or auxiliary field winding and the reactance in series.

With particular reference to Figure 7, "heater volts" are indicated by the Y or ordinate axis, and "motor speed" is indicated on the X axis or abscissa with the zero points of both axes occurring at the intersection of the axes. Since the heater element 70 is connected directly across the power supply line leads 20 and 22 when the contacts are in their normally closed position for starting the motor, line voltage is applied to the heater element 70 as indicated by the curve C, until the contacts 60 and 62 open. When the contacts 60 and 62 open, the voltage across the heater element 70 changes to a point on the curve D for a corresponding motor speed, because with the contacts open, the voltage across the heater element 70 is that induced across the starting or auxiliary field winding 16 by the rotor flux. If, when the contacts are open the rotor speed decreases, the voltage across the heater element 70 decreases along the curve D.

In the operation of the circuit shown in Figure 1, contacts 24 and 26 are normally closed when the motor is not running. Hence, when a voltage is applied to the power supply line leads 20 and 22, both the main and starting or auxiliary field windings are energized, so that the rotor will begin to rotate. Since the thermal-responsive element is connected across the third winding 18 and in series with the auxiliary field winding 16, and because the thermal-responsive element has inherent resistance, the thermal-responsive element will be heated by the current flowing therethrough from the auxiliary field winding, and by the current flow therethrough that is effected by the voltage induced across the third winding by the rotor flux as the rotor gains speed. The polarity of the third winding is preferably such that the current flow through the thermal responsive element due to the potential across the third winding aids the current from the starting winding. Having the thermal-responsive element and its resistance properly designed for the current values of the motor, the thermal-responsive element flexes in a predetermined period of time by an amount sufficient to effect disengagement of the contacts 24 and 26. This disengagement of the contacts 24 and 26 opens the circuit to the auxiliary field winding 16; but the third winding is so designed that the voltage induced across that winding by the rotor flux, when the rotor is rotating at or above a predetermined speed, produces a current flow through the thermal-responsive element sufficient to maintain a flexure of the thermal-responsive element at which the contacts will be maintained in an open position. The switch 28 thus has a normal or starting position in which the contacts 24 and 26 are closed to establish the starting circuit, and a running position in which the contacts are opened to establish the running circuit of the motor. The positions of the switch are controlled by the thermal-responsive element as explained before in the operation of the system and in the explanation of the curves shown in Figure 3. In the system shown in Figure 1, the contact 26 is connected directly to one end of the third winding 18 and to one end of the thermal-responsive element. By virtue of this connection, the current through both legs of the thermal-responsive element is substantially the same and the auxiliary field winding current flows through both legs of the thermal-responsive element in series.

The operation of the circuit shown in Figure 2 is substantially similar to that of the system shown in Figure 1, except that when the switch is in the normal or starting position, the auxiliary field winding current flows directly through one leg of the thermal-responsive element, and through the third winding 18 to the other leg of the thermal-responsive element. In this system, the third winding 18 is preferably connected so that the third winding current aids that of the starting winding.

In the operation of the system shown in Figure 4, when the voltage is applied to the power supply line leads 20 and 22, and the thermal-responsive element is in the normal or starting position, so that the contacts 60 and 62 are closed, the rotor begins to rotate. At the instant the voltage is applied to the leads 20 and 22, under the above circumstances, susbtantially line voltage is applied across the heater or resistance element 70, which element is in heat-transferring relation with the thermal-responsive element 64. Also, the starting winding current flows through the thermal-responsive element 64 which, having inherent resistance, is heated both by the starting winding current and the heat from the heater element 70. The heater element 70 and thermal-responsive element 64 being properly designed for the motor with which they are used and the line voltage that is applied to the motor, the thermal-responsive element flexes after a predetermined time interval to open the circuit to the auxiliary field winding. The heater element is also so cooperatively designed with respect to the starting winding 16 that the voltage induced across the auxiliary winding by the rotor flux after the contacts 60 and 62 are opened causes a sufficient current flow through the heater element that the thermal-responsive element is maintained in a flexed position and the contacts 60 and 62 are maintained open. However, if the rotor speed drops to a value below which the voltage induced in the starting field winding is sufficient to maintain the proper temperature of the heater element to keep the contacts open, the thermal-responsive element flexes back to effect reengagement of the contacts 60 and 62. This thermal responsive switch also, therefore, has a starting position in which the contacts 60 and 62 are closed and a starting circuit is established, as well as a running position in which the contacts 60 and 62 are open and the running circuit of the motor is established.

The operation of the circuits shown in Figures 5 and 6 is substantially similar to that described for the system shown in Figure 4, although reactances, such as condensers are used to shift the phase of the starting winding current.

While the embodiment of the present invention as herein disclosed, constitutes a preferred form, it is to be understood that other forms might be adopted, all coming within the scope of the claims which follow.

What is claimed is as follows:

1. In combination, a motor having a rotor, starting and running windings, and a third winding connected to the starting winding and magnetically associated with the rotor; a thermal-responsive switch having a thermal-responsive element and a pair of cooperating contacts one of which contacts is actuated by the thermal-responsive element to effect engagement and disengagement of the contacts, said thermal-responsive element being connected across the third winding and in series with the starting winding so that the starting winding current and third winding current effect heating of the thermal-responsive element to operate the contacts.

2. In combination, a motor having a rotor, starting and running windings, and a third winding connected to the starting winding and magnetically associated with the rotor; a thermal-responsive switch having a thermal-responsive element and a pair of cooperating contacts one of which contacts is actuated by the thermal-responsive element to effect engagement and disengagement of the contacts, said thermal-responsive element being connected across the third winding and in the circuit of the starting winding so that the third winding current and at least a part of the starting winding current effect heating of the thermal-responsive element to operate the contacts and the third winding current maintains temperature of the thermal-responsive element to hold the contacts in the position to which they were operated by the starting and third winding currents.

3. In combination, a motor having a rotor, starting and running windings and a third winding magnetically associated with the rotor, and a thermal-responsive switch having a thermal-responsive element and a pair of cooperating contacts, one of which contacts is actuated by the thermal-responsive element to effect engagement and disengagement of the contacts, said thermal-responsive element being responsive to the starting and third winding currents.

4. In combination, a motor having a rotor, starting and running windings and a third winding magnetically associated with the rotor, and a thermal-responsive switch having a thermal-responsive element and a pair of cooperating contacts, one of which contacts is actuated by the thermal responsive element to effect engagement and disengagement of the contacts to control the circuit to the starting winding, said thermal-responsive element being responsive to the starting and third winding currents when the contacts are engaged and responsive to the third winding current when the contacts are disengaged.

5. In combination, a motor having a rotor, starting and running windings and starting and running circuits therefor, said motor also having a third winding magnetically associated with the rotor, and a switch for controlling the starting and running circuits, said switch having a thermal-responsive element responsive to the starting winding current and third winding current for actuating the switch to change from the starting to the running circuit, and said element being responsive to the voltage induced in the third winding by the rotor flux after the change to the running circuit.

6. In combination, a motor having a rotor, starting and running windings and starting and running circuits therefor, said motor also having a third winding magnetically associated with the rotor, and a switch for controlling the starting and running circuits, said switch having means responsive to the starting winding current and third winding current for actuating the switch to change from the starting to the running circuit, and said means being responsive to the voltage induced in the third winding by the rotor flux after the change to the running circuit.

7. In combination, a motor adapted to be connected to a power supply line and having a rotor and a plurality of windings magnetically associated with the rotor starting and running circuits for the motor, a thermal-responsive switch having "start" and "run" positions for controlling the starting and running circuits, said switch being responsive to current flowing through one of the windings from the power supply line and to voltage induced across one of the windings by the rotor flux when the switch is in the "start" position, and said switch being responsive to the voltage induced across one of the windings by the rotor flux when the switch is in the "run" position.

8. In combination, a motor adapted to be connected to a power supply line and having a rotor and a plurality of windings magnetically associated with the rotor and including an auxiliary field winding and a third winding, starting and running circuits for the motor, a thermal-responsive switch having "start" and "run" positions for controlling the starting and running circuits, said switch being responsive to current flowing through the auxiliary field winding from the power supply line and to voltage induced across the third winding by the rotor flux when the switch is in the "start" position, and said switch being responsive to the voltage induced across the third winding by the rotor flux when the switch is in the "run" position.

9. In combination, a motor adapted to be connected to a power supply line and having a rotor and a plurality of windings magnetically associated with the rotor and including an auxiliary field winding, starting and running circuits for the motor, a thermal-responsive switch having "start" and "run" positions for controlling the starting and running circuits, said switch being responsive to current flowing through the auxiliary field winding from the power supply line and to voltage induced across the auxiliary field winding by the rotor flux when the switch is in the "start" position, and said switch being responsive to the voltage induced across the auxiliary field winding by the rotor flux when the switch is in the "run" position.

10. In combination, a motor adapted to be connected to a power supply line and having a rotor and a plurality of windings magnetically associated with the rotor, starting and running circuits for the motor, a switch having "start" and "run" positions for controlling the starting and running circuits, and a thermal-responsive element for effecting movement of the switch to said positions, said thermal-responsive element being connected in series with one of the windings when the switch is in the "start" position, and said thermal-responsive element being responsive to the voltage induced across one of the windings by the rotor flux to hold the switch in the "run" position.

11. In combination, a motor adapted to be connected to a power supply line and having a rotor and a plurality of windings including a starting winding and a third winding each magnetically associated with the rotor, starting and running circuits for the motor, a switch having "start" and "run" positions for controlling the starting and running circuits, said switch being actuated by a thermal-responsive element, said thermal-responsive element being connected in series with the starting winding when the switch is in the "start" position, and said thermal-responsive element being responsive to the voltage induced across the third winding by the rotor flux to hold the switch in the "run" position.

12. In combination, a motor adapted to be connected to a power supply line and having a rotor and a plurality of windings including an auxiliary field winding magnetically associated with the rotor, starting and running circuits for the motor, a switch having "start" and "run" positions for controlling the starting and running circuits, said switch being actuated by a thermal-responsive element, said thermal-responsive element being connected in series with the auxiliary field winding when the switch is in the "start" position, and said thermal-responsive element being responsive to the voltage induced across the auxiliary field winding by the rotor flux to hold the switch in the "run" position.

CALVIN J. WERNER.